(12) United States Patent
Ewert et al.

(10) Patent No.: US 8,406,380 B2
(45) Date of Patent: Mar. 26, 2013

(54) TEST PHONE USING SIP

(75) Inventors: Joerg Christian Ewert, Aachen (DE); Ola Melander, Wuerselen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 606 days.

(21) Appl. No.: 12/522,119

(22) PCT Filed: Jan. 3, 2007

(86) PCT No.: PCT/EP2007/050051
§ 371 (c)(1),
(2), (4) Date: Nov. 3, 2009

(87) PCT Pub. No.: WO2008/080635
PCT Pub. Date: Jul. 10, 2008

(65) Prior Publication Data
US 2010/0061524 A1    Mar. 11, 2010

(51) Int. Cl.
*H04M 1/24* (2006.01)
*H04M 3/08* (2006.01)
*H04M 3/22* (2006.01)
*H04L 12/26* (2006.01)

(52) U.S. Cl. ......................... 379/21; 379/10.02; 370/241

(58) Field of Classification Search ............... 379/1.01, 379/10.02, 26.01, 27.02, 27.04, 29.01; 370/241, 370/252
See application file for complete search history.

(56) References Cited

U.S. PATENT DOCUMENTS

| 2005/0213564 A1 | 9/2005 | Nguyen et al. | |
| 2006/0187850 A1* | 8/2006 | Ward et al. | 370/252 |
| 2006/0246923 A1* | 11/2006 | Krishnamurthi et al. | 455/458 |
| 2007/0011484 A1* | 1/2007 | Chriss et al. | 714/4 |

* cited by examiner

*Primary Examiner* — Quoc D Tran

(57) ABSTRACT

The invention provides a test phone whereby the test phone comprises means to communicate to a server, means to generate SIP signaling towards the server, whereby the test phone by means for SIP signaling may request the server to set-up a test call using specific resources for routing said test call.

24 Claims, 6 Drawing Sheets

TEST PHONE USING SIP

TECHNICAL FIELD

In the telecommunications world, there exists a need to test devices of a telecommunication network, either regarding their overall functionality or the quality they provide. The invention relates to an improved system allowing to use Phones using SIP as a Test phone.

BACKGROUND

Telecommunication exchanges, wireline as well as wireless exchanges, are equipped with a test position.

Typically, test position comprises an I/O device, an instrument box and a test phone.

The I/O device can be used to specify and retrieve details for the wanted test.

The instrument box can be used to connect measurement equipment and/or to receive or send tones, e.g. to generate in-band information.

The test phone can be a mobile or a fixed phone.

Typically, operators use the test position to check the call and routing analysis, to check the general speech quality, to check the performance and accessibility of specific resources by routing the call through these resources, and to monitor an ongoing call involving other parties to access the speech quality.

Such checks and analysis comprise an increasing value since premium services are offered typically along with certain warranted characteristics.

Traditionally, for the purposes stressed above the exchange needs to support PRA signaling (Primary Rate Access) towards the test phone.

However, in typical soft switch architecture, the exchange is split into one or more servers and one or more media gateways.

A server is responsible for call handling connecting to one or more media gateways, while the one or more media gateways are actually handling the payload data.

Typically, the servers are located centralized whilst the media gateways are located de-centralized.

By splitting up the architecture, it is now impossible to connect devices concerning payload data such as test phones and/or I/O devices towards the server unless the server provides extra hardware.

On the other hand although it would be possible to connect these devices towards a media gateway, the media gateway does not support call set-up and call control since these functionalities are shifted towards the server unless the media gateway provides extra hardware.

A present solution to this problem encompasses the use of a mobile phone as a test phone.

However, using a mobile phone leads to several limitations, making it a complement rather than replacement of a fixed test phone.

Such limitations include for example, that a mobile phone will only work when the radio network works, that the voice quality is limited to the voice quality of the mobile network, that the capabilities of the test phone are limited to the capabilities of the mobile phone, . . . .

Another solution used so far encompasses the use of a test phone in a remote exchange.

However, using a remote test phone leads to other disadvantages of which two are mentioned exemplary, i.e. that it is not possible to request certain resources to be used within a test call and that such remote test phones rely on the availability of the remote control.

Operators need a subjective way of testing the pay load connectivity (voice quality) which is independent from the radio network performance.

SUMMARY

It is the object to obviate at least some of the above disadvantages and provide an improved system and methods therefore which allows for greater flexibility.

The basic idea of this invention is to use a test phone using SIP.

Typically, Soft switch servers are equipped with a Media Gateway Control Function (MGCF), which allows for interworking between SIP and ISUP/BICC signaling networks.

In providing a test phone using SIP certain advantages may be achieved.

For example, using a test phone using SIP obviates an implementation of PRA in a Multi-Mediagateway (M-MGw).

Furthermore, it is also possible to use soft phones as a test phone using SIP, hence no new hardware is needed.

In addition, the test phone using SIP and a I/O-device functionality may be integrated in one work place and even more into one device.

Furthermore, such a test phone using SIP would also provide for execution of automatic test cases through SIP application servers. In this case the test phone using SIP could instruct an SIP application server to perform tests remotely, on request or even in a scheduled way. The results can either be stored and/or provided back to the instructing test phone or any other interested party.

It should also be mentioned, that such a test phone using SIP could support a broader range of bearer and teleservices, like video and data calls.

Furthermore, it would be possible to have a single test phone position supporting both native SIP test calls, circuit switched test calls and combinations of SIP and circuit switched test calls.

BRIEF DESCRIPTION OF THE DRAWINGS

By means of the appended figures the invention will now be described in detail.

In the following

DETAILED DESCRIPTION

Figure 1:
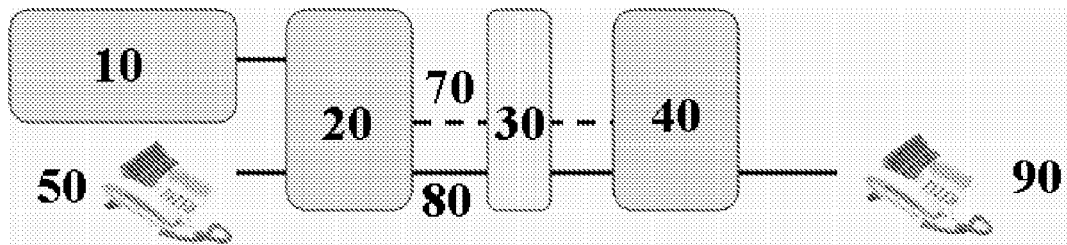
FIG. 1 shows a typical setup of a test position.

FIG. 1 shows a typical setup of a test position in an exchange 20. A fixed test phone 50 is connected via a group switch (not shown) towards the exchange 20.

Figure 2:
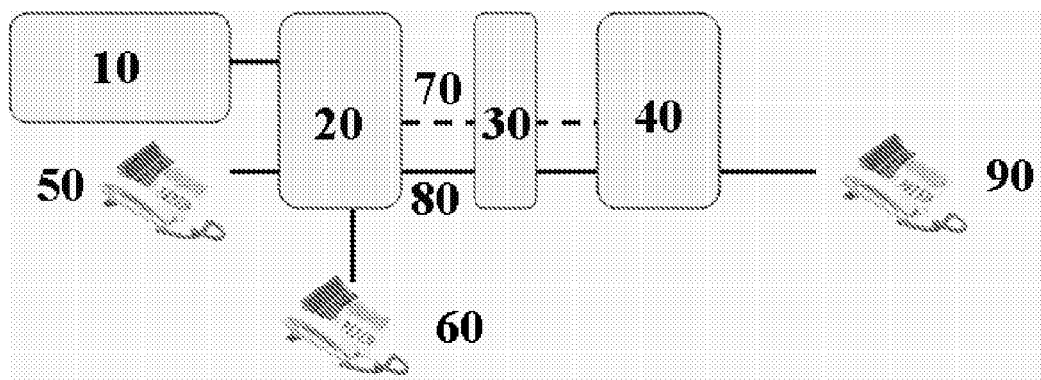
FIG. 2 shows another typical setup of a test position allowing to monitor an ongoing call involving other parties to access the speech quality.

FIG. 2 shows another typical setup of a test position in an exchange 20 allowing for monitoring an ongoing call involving other parties to access the speech quality.

Figure 3:
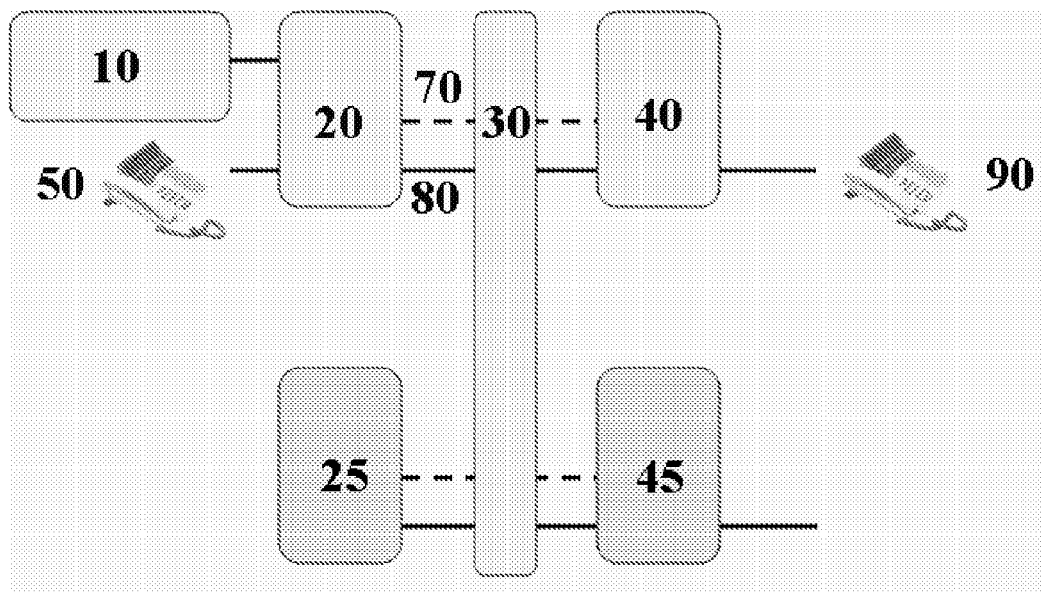
FIG. 3 shows a typical setup of a test position in a soft switch architecture.

FIG. 3 shows typical soft switch architecture. Here the exchange is split into a server, responsible for call handling, connecting to one or more media gateways, handling the payload.

It is only possible to connect a fixed test phone to the soft switch as long the server is equipped with extra hardware supporting the test phone.

The reason for this is that the server part of a soft switch does normally not handle payload data like voice.

The media gateway that handles payload data, lack the means to set-up and control test calls in a soft switch network.

Figure 4:
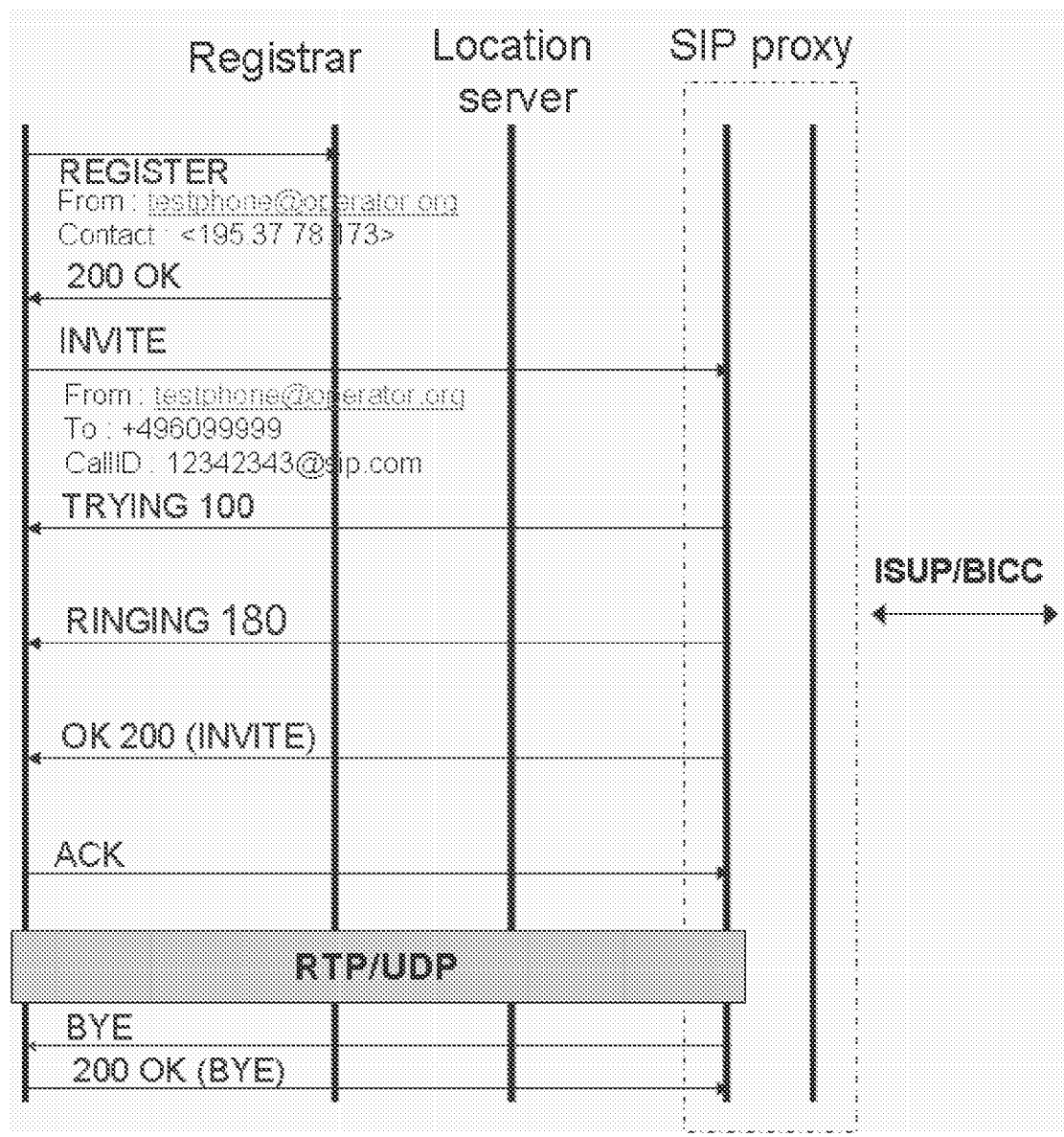
FIG. 4 shows a flow chart of messages involved in a test phone using SIP set-up according to the invention.
Figure 4A:
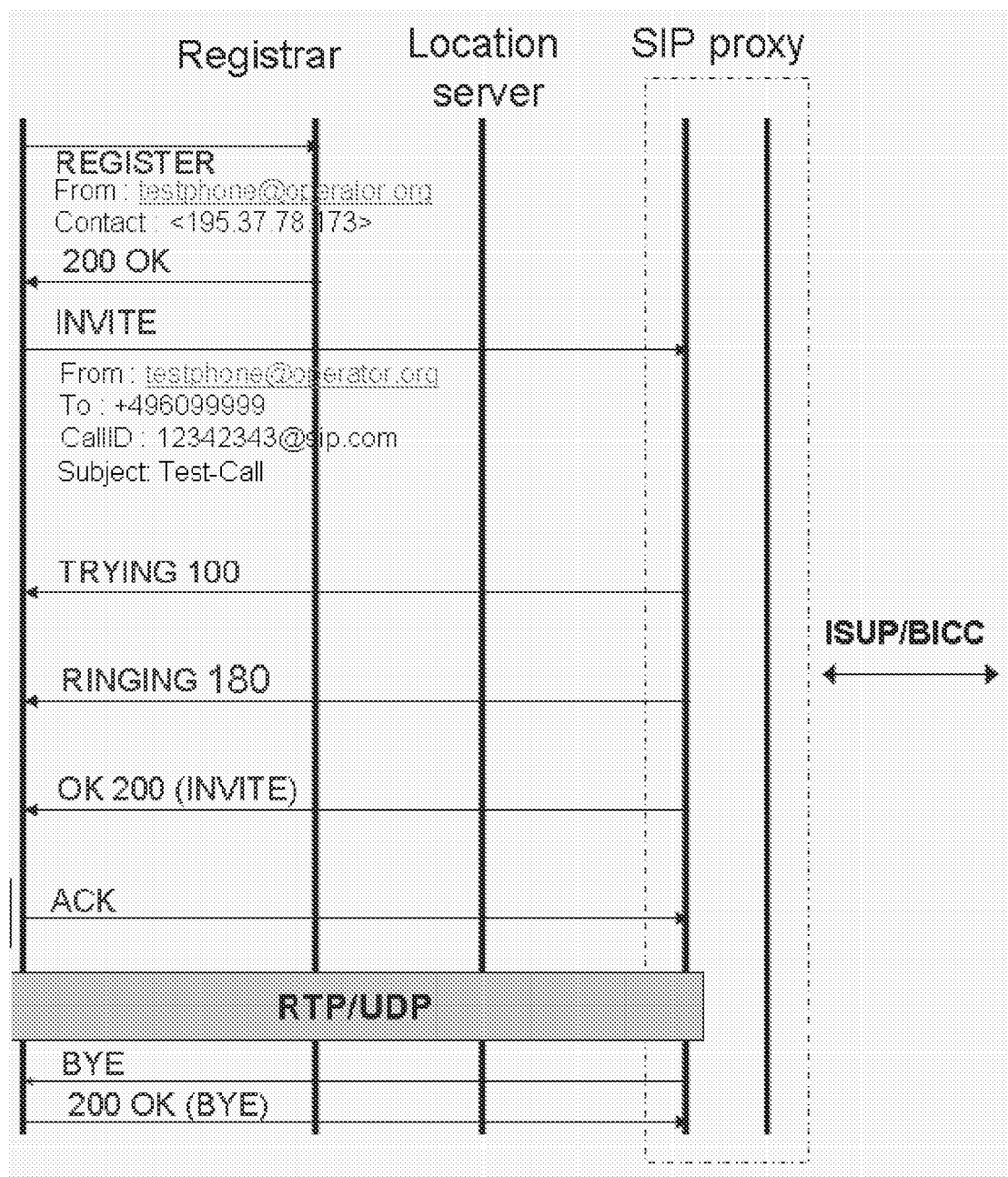

FIG. 4 shows a typical flow of messages involved in a test call. In the following, the content of the messages as well as the name of messages will be shown in italic letters.

In a set-up, where the Server does not provide for a user-network interface for the test phone, the test phone using SIP first registers with a Registrar for example by the following message Register
From : testphone@operator.org
Contact : <195.37.78.173>

The Registrar will typically reply a message
200 OK.

Once, the test phone is registered or otherwise can communicate to a server via a user-network-interface, the test phone may send an Invite message to a SIP proxy Invite
From : testphone@operator.org
To : +496099999
CallID : 12342343@sip.com which will typically answered by a
TRYING 100 message and possibly one or more Ringing 180 messages.

The Invite message may contain an attribute such as a predefined

Subject : Test-Call indicating to the SIP proxy that the call is a test-call.

Furthermore, attributes of the Invite message may contain additional information on the nature of the test call, i.e. which resources to use and/or which information to provide.

Attributes may be located in the header, e.g. like the subject attribute, and/or in the body of the Invite or any following message.

Figure 4B:
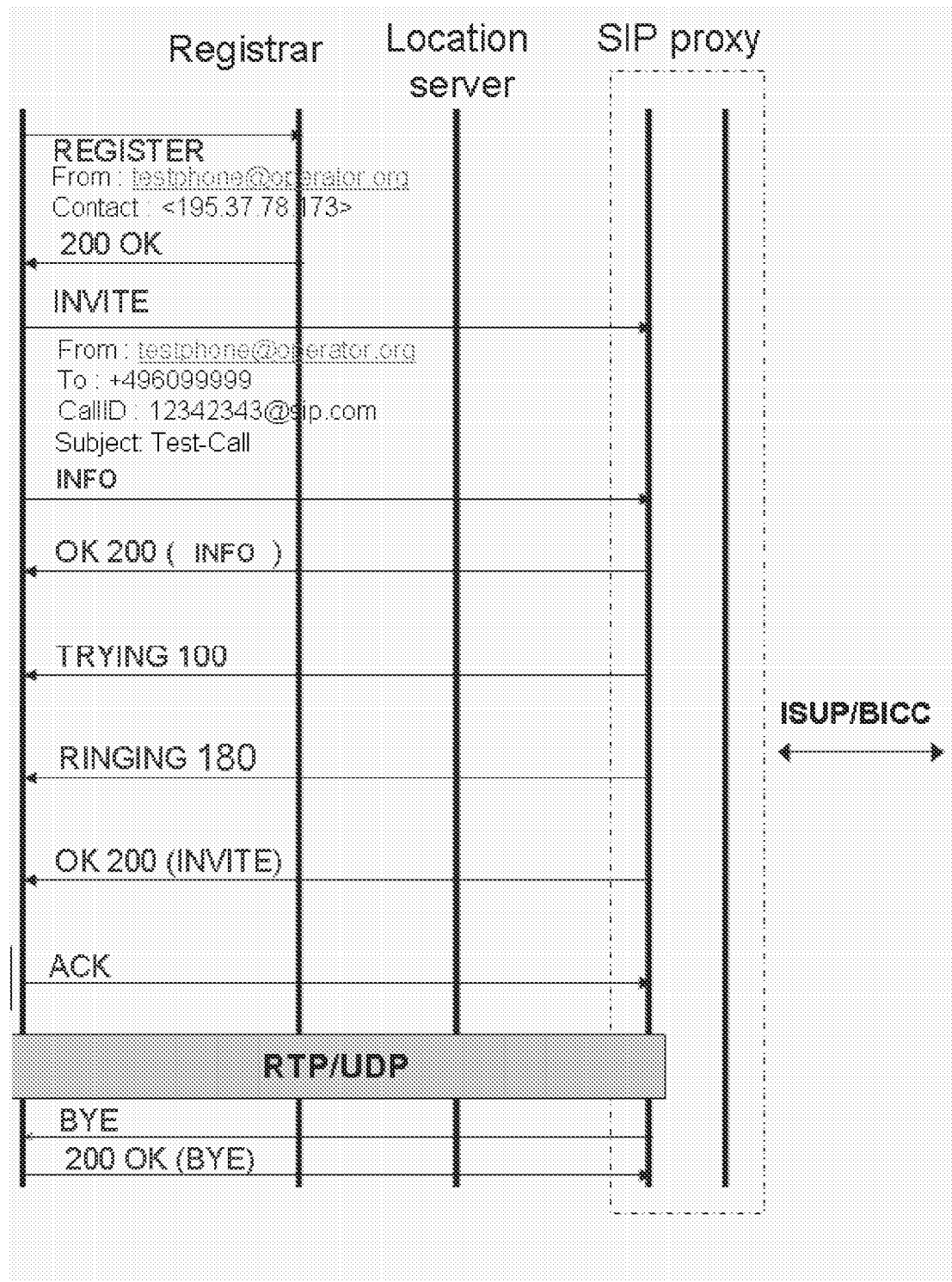
Figure 4C:
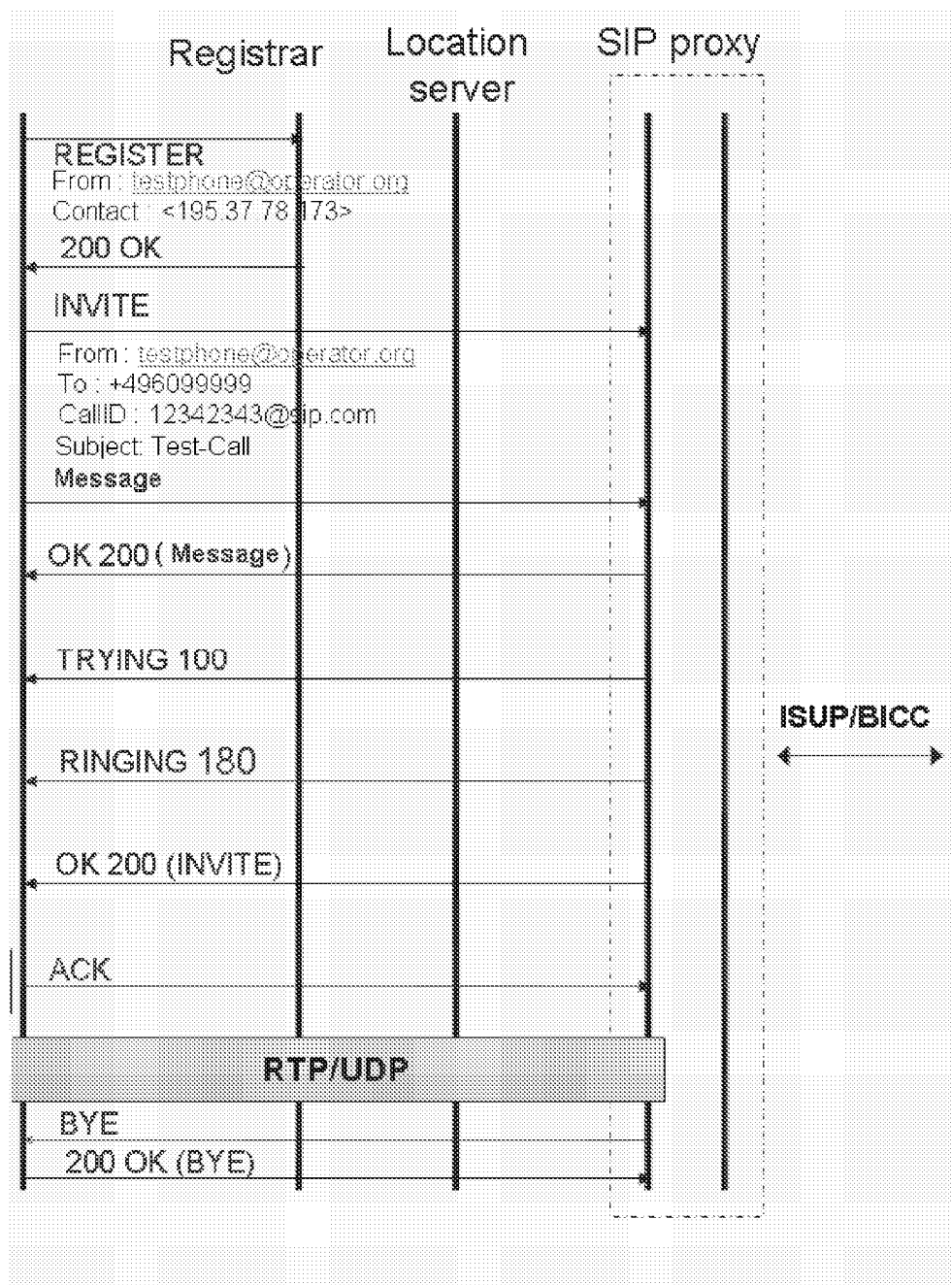
Figure 5A:
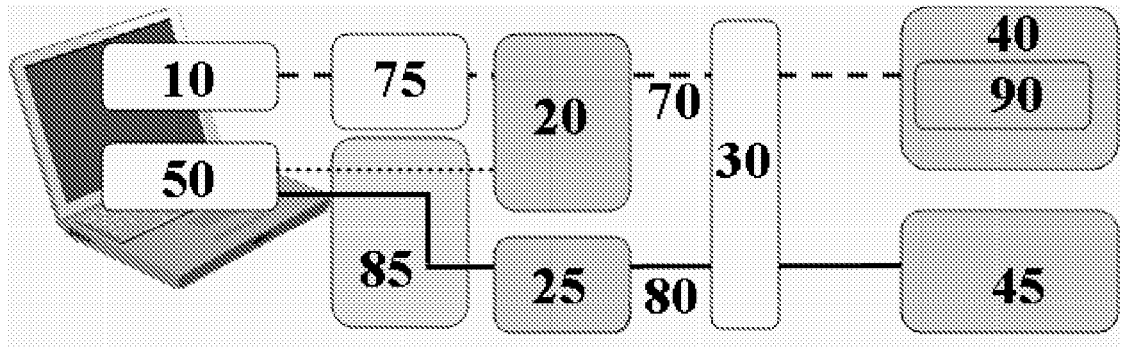
FIG. 5a shows a first alternative embodiment of the invention.
Figure 5B:
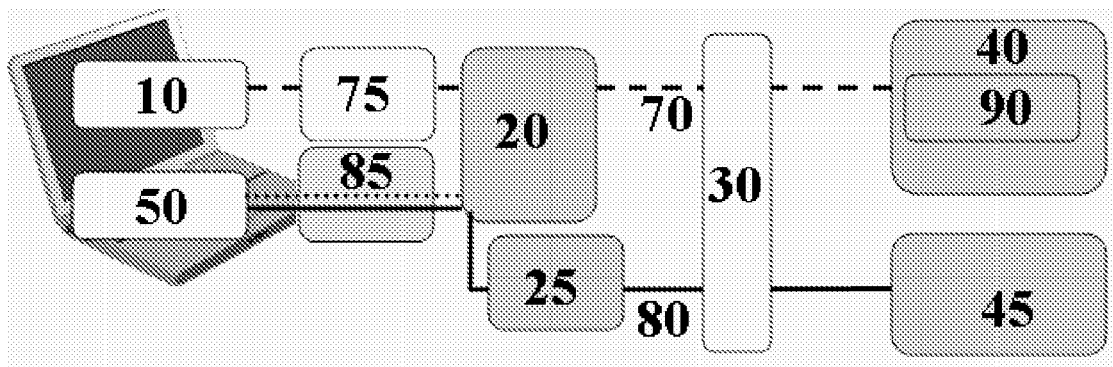
FIG. 5b shows a second alternative embodiment of the invention.
Figure 5C:
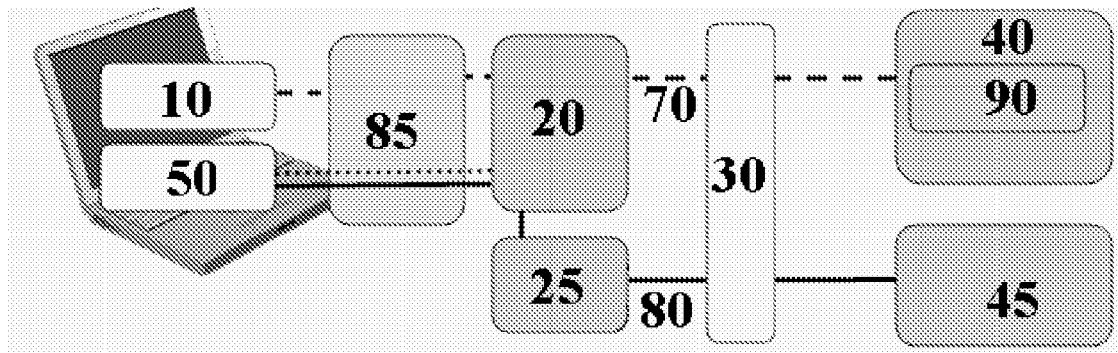
FIG. 5c shows a third alternative embodiment of the invention.

In further embodiments such additional information may also be transported via other appropriate methods, such as the SIP INFO method (RFC2976) as shown exemplary in FIG. 4b or the MESSAGE method (RFC3428) as shown exemplary in FIG. 4c.

The SIP proxy in turn will recognize the test-call and once the SIP proxy has received the additional information on the nature of the test call, i.e. which resources to use and/or which information to provide, the SIP proxy instructs the usage of resources and the provisioning of information of the appropriate resources, e.g. within Multimedia-Gateways (M-MGw), via appropriate signaling, e.g. GCP.

Information provided by the appropriate Multimedia-Gateways (M-MGw) will than in turn be reported to the SIP Proxy again via appropriate signaling, e.g. GCP.

Than, the Information will be provided via SIP signaling towards the test-phone. For example, the information may be transported via methods, such as the SIP INFO method (RFC2976) or the MESSAGE method (RFC3428).

In the meantime a corresponding media gateway control function (MGCF) of the SIP proxy/Server may translate some of the data provided in the invite message into corresponding ISUP/BICC signaling.

This message may contain additional information indicating that the call to be set-up is a test call. Furthermore, other information, e.g. specific resources to be used, may be included as well.

In further embodiments such information may also be transported via other methods, such as the SIP INFO method (RFC2976) or the MESSAGE method (RFC3428).

Apparently, the way the information is transported may vary. However, it is preferred to have the information transported according to SIP signaling.

Such information may be translated by an enhanced media gateway control function (MGCF) into corresponding BICC messages and vice versa. For example, information provided to the test phone may encompass used resources, protocol traces, error codes, dumps, etc . . . .

Once the called party is reached an OK 200 to the Invite message is sent towards the test phone, which in turn acknowledges the receipt of the message with an ACK message.

Than, one or more corresponding payload connection(s), e.g. an RTP/UDP connection, is/are established.

In the meantime, reported Information provided by the appropriate Multimedia-Gateways (M-MGw) will be reported by the SIP Proxy towards the SIP test phone and/or may be stored for further processing.

Again, such reported Information may be transported towards the SIP test phone by the methods, such as the SIP INFO method (RFC2976) or the MESSAGE method (RFC3428) as described above.

If information is to be stored, such information can be easily distinguished by means of a unique identifier, such as the Call-Id. Furthermore, the information may include a time stamp.

Once the test-call is to be finished, either the test phone (not shown) or the called party (as shown) may send a BYE message, which is turn acknowledged by a 200 OK message.

Obviously, also when no connection can be established the resources will report information as instructed backwards to the SIP Proxy.

Again, such information may be transported by the methods, such as the SIP INFO method (RFC2976) or the MESSAGE method (RFC3428) as described above.

In order to prevent misuse of the features provided by test-phone functionality as shown above, the procedures may be subject to authorization procedures.

As a further embodiment, the sip phone may be a softphone, i.e. implemented in a computerized device such as a desktop computer, a laptop computer or any comparable device.

Furthermore, the functionality of an instrument-box as explained above may be implemented in the test-phone either in software or in hardware.

For example, DTMF tones may be transported via the INFO method. Such DTMF signaling may be used as explained above to transport additional information, i.e. information on the nature of the test call, i.e. which resources to use and/or which information to provide.

As already indicated it is also possible to let a test phone using SIP instruct an SIP application server. In doing so, it is possible to let automatic test cases being executed by the SIP application servers.

In doing so, functionality of a test phone using SIP is shifted to the application server. Thereby a simple, standard SIP phone can be used and the specialized processing relating to test calls in a SIP environment is handled by the application server.

Furthermore, some of the functionality of the Multimedia-Gateways is shifted to the application server as well. The application server is able to handle different types and revisions of MSS nodes without the need to update the MSS nodes.

Furthermore, this solution also provides for an improved way of authorizing and authentication of users. A SIP application server for example typically has access to confidential parts of the network acting as a filter and firewall. SIP phones can request test calls to the application server. Depending on the user, location, type of test call requested, time of the day, addressed resource, etc. the application server may or may not grant and execute the request after consulting security mechanisms within and outside the SIP domain.

The application server can be part of a bigger application, securing that a SIP initiated test call is tied to a bigger work flow not available in the SIP domain, like gathering network performance statistics including QoS metrics, as well as scheduling maintenance staff and hardware replacement.

Such an application server may be instructed after a SIP session is successfully established by sending appropriate SIP-INFO message(s).

The results from the tests are send back via SIP-INFO messages.

The test phone will instruct the SIP application server. In this case the test phone using SIP could instruct an SIP application server to perform tests remotely, on request or even in a scheduled way. The results can either be stored and/or provided back to the instructing test phone or any other interested party.

The invention claimed is:

1. A test phone, whereby the test phone comprises means to communicate to a server, means to generate SIP signaling towards the server requesting the server to set-up a test call using specific resources for routing said test call, whereby the specific resources are specified by the test phone, wherein
the specific resources are one or more media gateways,
the server is responsible for call handling, and
the one or more media gateways handle payload data associated with a call.

2. The test phone according to claim 1, further comprising means for specifying the server to monitor QoS parameter.

3. The test phone according to claim 1, wherein said means to generate SIP signaling further specifies the server to report fault values.

4. The test phone according to claim 1, wherein said means to generate SIP signaling further specifies the server to report transfer protocol.

5. The test phone according to claim 1, wherein said test call includes setting up an audio, a video, a data or a multimedia session.

6. The test phone according to claim 1, whereby the test phone comprises instrument box functionality for generating inband signaling.

7. The test phone according to claim 1, wherein a soft switch exchange splits functionality for call handling and payload handling between the server and the one or more media gateways.

8. A Server, whereby the server comprises means to communicate to a test phone, means to generate SIP signaling towards the test phone, means for interworking between SIP and ISUP/BICC signaling networks, wherein said means to generate SIP signaling is adapted to be requested to set-up a test call using specific resources for routing said test call, whereby the specific resources are specified by the test phone, wherein
the specific resources are one or more media gateways,
the server is responsible for call handling, and
the one or more media gateways handle payload data associated with a call.

9. The Server according to claim 8, further comprises means for reporting monitored QoS parameter to the test phone.

10. The Server according to claim 8, wherein said means to generate SIP signaling reports fault values to the test phone.

11. The Server according to claim 8, wherein said means to generate SIP signaling reports transfer protocol traces to the test phone.

12. The Server according to claim 8, wherein said means to generate SIP signaling dumps specified call related data.

13. The Server according to claim 8, wherein said test call includes setting up an audio, a video, a data or a multimedia session.

14. A method for a test phone for setting-up a test call using SIP, comprising the steps of:
sending a message towards a server to set-up a call, indicating that that the call is a test call,
requesting the server using SIP signaling to set-up the test call using specific resources for routing said test call, whereby the specific resources are specified by the test phone, wherein
the specific resources are one or more media gateways,
the server is responsible for call handling, and
the one or more media gateways handle payload data associated with a call.

15. The method according to claim 14, further comprising the step of:
requesting the Server using SIP signaling to monitor QoS parameter.

16. The method according to claim 14, further comprising the step of:
requesting the server using SIP signaling to report fault values.

17. The method according to claim 14, further comprising the step of:
requesting the server using SIP signaling to report transfer protocol.

18. The method according to claim 14, wherein said test call includes setting up an audio, a video, a data or a multimedia session.

19. The method according to claim 14, further comprising the step of:
generating in-band signaling.

20. A method for a server for setting-up a test call using SIP, comprising the steps of:
receiving a message from a test phone to set-up a call, indicating that that the call is a test call;
receiving a SIP signaling request to set-up the test call using specific resources for routing said test call, whereby the specific resources are specified by the test phone, wherein
the specific resources are one or more media gateways,
the server is responsible for call handling, and
the one or more media gateways handle payload data associated with a call.

21. The method according to claim 20, further comprising the step of:
reporting monitored QOS parameter to the test phone.

22. The method according to claim 20, further comprising the step of:
reporting fault values to the test phone.

23. The method according to claim 20, further comprising the step of:
reporting transfer protocol traces to the test phone.

24. Method according to claim 20, whereby the server provides on a continuous basis reports by means of SIP signaling to the test phone.

* * * * *